(12) United States Patent
Hong

(10) Patent No.: US 6,981,692 B2
(45) Date of Patent: Jan. 3, 2006

(54) PUSHBUTTON VALVE ASSEMBLY

(75) Inventor: Sam T. Hong, Sparks, NV (US)

(73) Assignee: Haws Drinking Faucet Company, Sparks, NV (US)

( * ) Notice: Subject to any disclaimer, the term of this patent is extended or adjusted under 35 U.S.C. 154(b) by 0 days.

(21) Appl. No.: 10/888,455

(22) Filed: Jul. 8, 2004

(65) Prior Publication Data

US 2005/0023499 A1    Feb. 3, 2005

Related U.S. Application Data

(60) Provisional application No. 60/490,728, filed on Jul. 28, 2003.

(51) Int. Cl.
*F16K 1/00* (2006.01)

(52) U.S. Cl. .................................. 251/321; 137/315.11

(58) Field of Classification Search ........ 251/319–323; 137/315.11, 495

See application file for complete search history.

(56) References Cited

U.S. PATENT DOCUMENTS 4,951,918 A * 8/1990 Wells et al. ................ 251/321

* cited by examiner

*Primary Examiner*—David J. Walczak
*Assistant Examiner*—Peter deVore
(74) *Attorney, Agent, or Firm*—Kelly Lowry & Kelley, LLP

(57) ABSTRACT

A pushbutton valve assembly for regulating water flow from a water supply to a point of use such as a bubbler head of a drinking fountain. The valve assembly includes a valve body adapted for mounting onto a suitable housing panel or the like, and includes an internal valve cartridge for on-off control of water flow. A pushbutton is rotatably carried by an escutcheon ring mounted rotatably onto an exposed outboard end of the valve body, and this pushbutton is axially movable between depressed and non-depressed positions for on-off operation of the valve cartridge. The pushbutton and the escutcheon ring include respective pairs of axially open wrench ports which can be axially aligned upon appropriate pushbutton rotation to accommodate reception of a tool such as a spanner wrench for rotatably removing the escutcheon ring from the valve body, thereby exposing the valve cartridge for service or replacement.

24 Claims, 7 Drawing Sheets

PUSHBUTTON VALVE ASSEMBLY

This application claims the benefit of U.S. Provisional Application 60/490,728, filed Jul. 28, 2003.

BACKGROUND OF THE INVENTION

This invention relates generally to improvements in valve assemblies of the type having a pushbutton operator for on-off control of water flow or the like, such as for use in controlling water flow to a bubbler head of a drinking fountain or the like. More particularly, this invention relates to an improved pushbutton-type valve assembly wherein the pushbutton operator is adapted for relatively quick and easy disassembly from a valve body to exposed an internal valve cartridge for facilitated service, repair or replacement. However, in accordance with the invention, removal of the pushbutton operator requires manipulation of components and the use of a special tool thereby providing a valve assembly construction that is not readily susceptible to unauthorized tampering or vandalism.

Drinking fountains are known in the art for use in both indoor and outdoor installations to provide a source of clean water suitable for human consumption. A typical fountain construction includes an upstanding or wall-mounted housing supporting at least one fountain or bubbler head positioned above and/or at one side of a suitable drain basin. The fountain housing normally encloses or conceals appropriate plumbing lines for coupling the bubbler head to a suitable water supply source. A user-accessible valve is mounted onto the fountain housing, or alternately mounted directly onto the bubbler head, for manual on-off movement to regulate water flow.

In many drinking fountain designs, the user-accessible valve includes a pushbutton-type operator designed for movement between a normal non-depressed position with the water supply turned off, and a manually depressed position for turning the water supply on. More particularly, a spring-loaded pushbutton is exposed to the exterior of the drinking fountain for user access, wherein the pushbutton is adapted for manual depression by the individual user to shift an internally mounted valve unit or cartridge from a normally closed position to an open position thereby initiating water flow to the bubbler head. Upon release of the pushbutton, the valve unit or cartridge automatically returns to the normal closed position thereby terminating the water flow to the bubbler head. One significant benefit or advantage provided by such pushbutton valve operators is that the internal valve components are concealed within the fountain housing and thus rendered substantially inaccessible to unauthorized persons to reduce incidents of undesirable tampering and related vandalism.

Pushbutton valve assemblies, however, have not provided for facilitated and convenient access to the concealed valve unit or valve cartridge by authorized maintenance personnel for purposes of periodic service, repair or replacement, in a manner consistent and compatible with prevention of unauthorized tampering and vandalism. That is, in such valve designs, it has been necessary for service personnel to remove access panels mounted onto the fountain in order to access and service the internal valve components by reaching through such access panels into the interior of a fountain housing. Such method undesirably requires service personnel to perform difficult mechanical assembly and disassembly steps while reaching into the typically cramped interior of the fountain housing, and often with limited visibility.

There exists, therefore, a need for further improvements in and to pushbutton valve assemblies designed for use in a drinking fountain or the like, wherein a pushbutton operator provides convenient and substantially tamperproof on-off control of water flow, and further wherein the pushbutton operator is adapted for relatively quick and easy disassembly from the exterior of the drinking fountain for convenient and substantially direct external access to an internal valve unit or cartridge for appropriate service, repair or replacement. The present invention fulfills these needs and provides further related advantages.

SUMMARY OF THE INVENTION

In accordance with the invention, a pushbutton valve assembly is provided for regulating water flow from a suitable water supply source to a point of use such as a bubbler head of a drinking fountain. The valve assembly includes a pushbutton operator unit or subassembly mounted onto a valve body which is adapted in turn for mounting onto a suitable housing panel or the like and includes an internal valve unit or valve cartridge for on-off control of water flow. The pushbutton operator unit is exposed for convenient user access for turning the water supply on and off. In addition, the pushbutton operator unit is removable quickly and easily from the valve body by authorized maintenance personnel for convenient external access to the internal valve unit or cartridge for appropriate service, repair or replacement. However, such disassembly of the pushbutton operator unit requires special manipulation of components, and a special tool, thereby substantially preventing undesirable tampering and related vandalism by unauthorized persons.

The pushbutton operator unit comprises includes an outer pushbutton rotatably carried on an underlying escutcheon ring which is adapted for removable rotatable mounting as by threading onto an exposed outboard end of the valve body. In the installed position, the outer pushbutton is axially movable between depressed and non-depressed positions for on-off operation of the internal valve unit or cartridge for turning the water supply on and off. The pushbutton and the escutcheon ring each include at least one and preferably a pair of axially open wrench ports positioned off-axis and at common radial positions relative to a centerline of the pushbutton operator unit. These respective wrench ports in the pushbutton and escutcheon ring can be axially aligned upon appropriate relative rotation of the pushbutton to accommodate reception of a special tool such as a spanner wrench. In particular, the spanner wrench includes tool tips for reaching through the pushbutton wrench ports and for seating within the escutcheon ring wrench ports for applying torque thereto for rotatably installing or rotatably removing the escutcheon ring relative to the valve body. Removal of the pushbutton operator unit from the valve body exposes the internal valve unit or cartridge for appropriate service or replacement.

When the pushbutton operator unit is installed onto the valve body, the internal valve unit or cartridge is concealed against unauthorized access from the exterior of the fountain housing. The outer pushbutton is freely rotatable relative to the underlying escutcheon ring, whereby the wrench ports formed in the pushbutton are normally misaligned with the wrench ports formed in the underlying escutcheon ring. As a result, component disassembly is disguised to discourage unauthorized tampering. In the event that the pushbutton is rotatably positioned to align the wrench ports therein with the wrench ports formed in the escutcheon ring, the special tool is still required for component disassembly.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is an exploded side elevation view showing installation of the pushbutton valve assembly onto a housing panel of a drinking fountain or the like;

FIG. 5 is an enlarged vertical sectional view illustrating the pushbutton valve assembly installed onto a housing panel of a drinking fountain or the like;

FIG. 6 is an enlarged and fragmented outboard end elevation view showing the pushbutton valve assembly mounted on a housing panel of a drinking fountain or the like;

DETAILED DESCRIPTION OF THE PREFERRED EMBODIMENT

Figure 1:
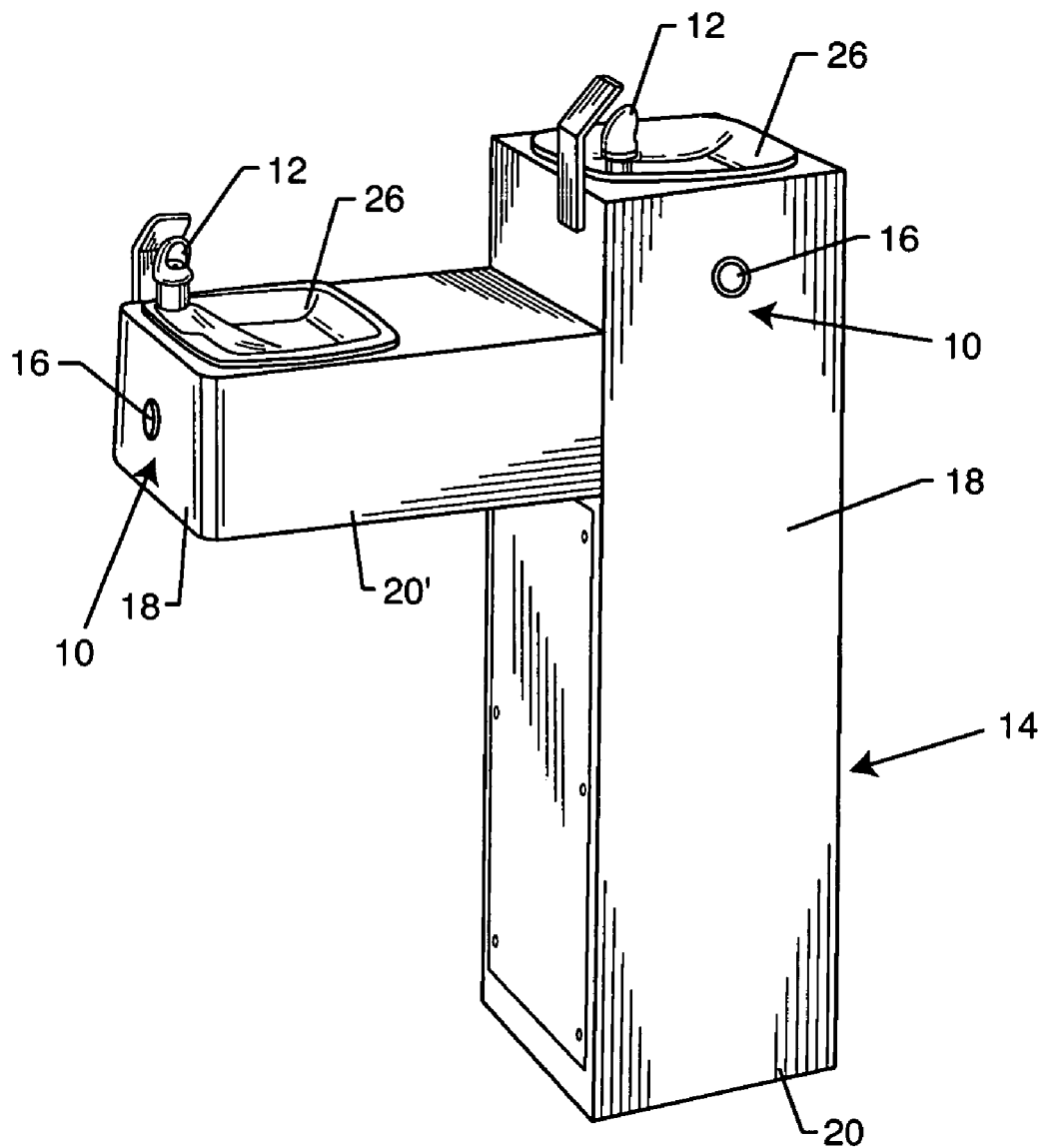
FIG. 1 is a perspective view of a drinking fountain incorporating a pushbutton valve assembly constructed in accordance with the novel features of the present invention.
Figure 2:
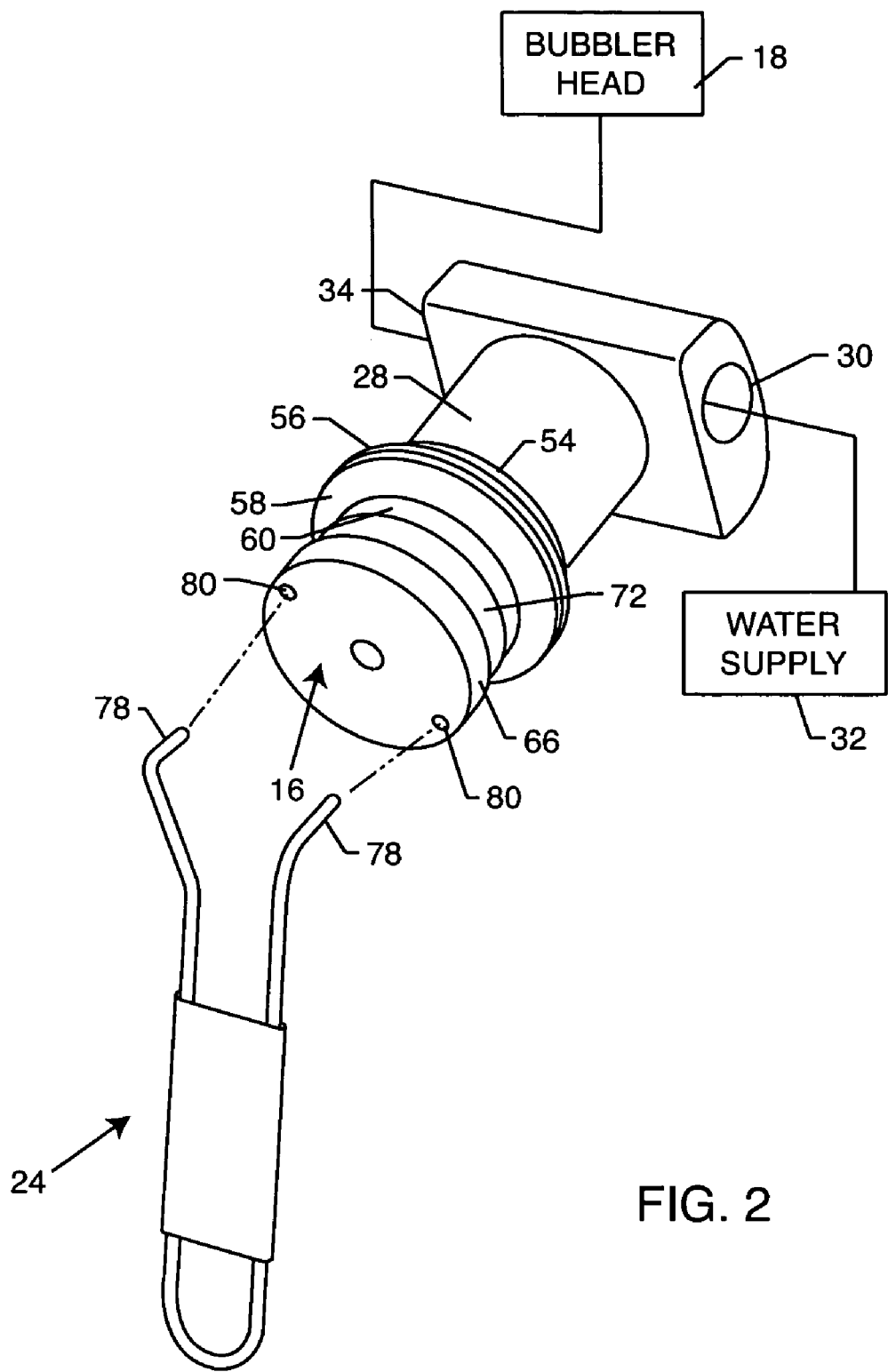
FIG. 2 is an enlarged perspective view of the pushbutton valve assembly, depicted in schematic relation with components of a drinking fountain or the like, and in exploded relation with a special tool for removal of a pushbutton operator unit or subassembly from a valve body to access an internally mounted valve cartridge.
Figure 3:
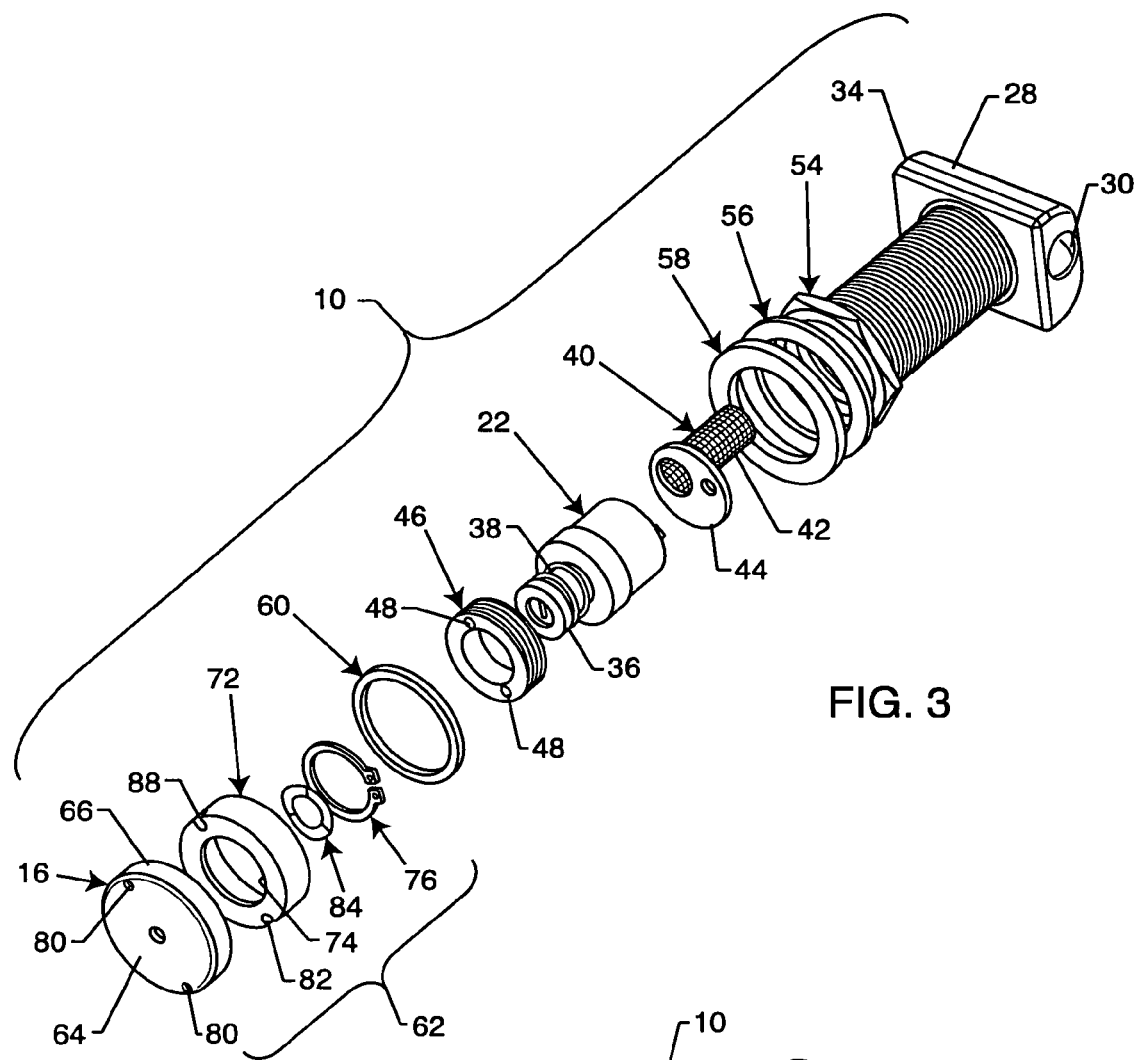
FIG. 3 is an exploded perspective view depicting the components of the pushbutton valve assembly.

As shown in the exemplary drawings, a pushbutton valve assembly referred to generally in FIG. 1 by the reference numeral 10 is provided on-off control of water flow to a point of use such as a bubbler head 12 of a drinking fountain 14 or the like. The valve assembly 10 includes a simple pushbutton 16 exposed to the exterior of the fountain 14, as by exposure through a panel 18 of an otherwise substantially enclosed fountain housing 20, wherein this pushbutton 16 is adapted for movement between depressed and non-depressed positions for turning the water flow respectively on and off. The pushbutton 16 is removable from the exterior of the fountain to permit external exposure of an otherwise internally mounted and concealed valve unit or cartridge 22 (FIGS. 3, 5 and 8–9), thereby permitting convenient external access to the valve cartridge 22 for appropriate service, repair or replacement. However, pushbutton removal requires special manipulation of valve assembly components and the use of a special tool 24 (FIGS. 2 and 7–8), whereby the pushbutton valve assembly 10 is resistant to unauthorized tampering and related vandalism.

FIG. 1 shows the pushbutton valve assembly 10 of the present invention installed on a drinking fountain 14 of a type having a pair of bubbler heads 12 supported by the fountain housing 20. In this regard, the fountain housing 20 is shown in the form of a generally upstanding and substantially enclosed housing structure of generally rectangular cross sectional shape, with a first bubbler head 12 located at an upper end thereof and disposed generally at one side of a drain basin 26. An auxiliary or secondary housing portion 20' protrudes in cantilevered relation from one side of this upstanding housing structure 20 and supports a second bubbler head 12 located generally at one side of another drain basin 26. Each of the two bubbler heads 12 is associated with a respective one of a pair of pushbutton valve assemblies 10 mounted within or on the fountain housing 20, 20', with the pushbuttons 16 thereof externally exposed for access by a person using the drinking fountain. Persons skilled in the art will recognize and appreciate that the drinking fountain 14 may be constructed in a wide variety of different geometric configurations including but not limited to free-standing and wall-mounted fountain designs.

In general terms, the pushbutton valve assembly 10 of the present invention comprises a valve body 28 (FIGS. 2–6 and 7–9) having the valve unit or cartridge 22 mounted therein. As viewed best in FIGS. 2 and 5, the valve body 28 includes a water inlet port 30 adapted for suitable connection to a water supply 32, such as a conventional tap water feed source, and a water outlet port 34 adapted for suitable connection to the associated bubbler head 12. The valve cartridge 22 is slidably received into the valve body 28 through an open outboard end thereof (FIGS. 3 and 5), and includes a reciprocal valve stem 36 movable for opening and closing a water flow path between the inlet and outlet ports 30, 34. A biasing spring 38 normally loads the valve stem 36 toward a retracted or non-depressed position (FIG. 5) for normally positioning closing this water flow path, thereby preventing water flow to the bubbler head 12. However, the valve stem 36 can be depressed against the spring 38 for opening this water flow path and permitting water flow to the bubbler head 12, with the spring 38 automatically returning the stem 36 to the closed position upon release thereof. One exemplary valve cartridge 22 comprises Model No. 7CR21, marketed by Thermodisc, a division of Emerson Electric, St. Thomas, Ontario, Canada. See also U.S. Pat. No. 3,902,600, which is incorporated by reference herein. A filter element 40 shown in the form of a cup-shaped porous mesh basket 42 suspended from an upper support flange 44 is also conveniently provided at the inlet port 30 for capturing and collecting water-entrained debris and particulate.

The valve cartridge 22 is slidably seated and retained within the valve body 28 by means of a retainer nut 46 or the like. This retainer nut 46 is depicted in the illustrative drawings in the form of an externally threaded annular component having a size and shape for installation into an internally threaded outboard end of the valve body 28. In the preferred form, the retaining nut 46 includes at least one and preferably a pair of diametrically opposed wrench ports 48 for engagement by tool tips of the spanner wrench 24 or the like for applying torque to the retainer nut 46 in the course of installation or removal thereof relative to the valve body 28, as will be described herein in more detail. In the installed position, as viewed best in FIG. 9, the valve stem 36 of the valve cartridge 22 protrudes outwardly through and a short distance beyond the retainer nut 46 for pushbutton actuation.

Removal of the retainer nut 46 permits slide-out removal of the valve cartridge 22 and the associated filter element 40 for appropriate service, cleaning, repair, or replacement of these components.

The valve body 28, with the valve cartridge 22 mounted and retained therein, is mounted on the drinking fountain 14 with the outboard end of the valve body 28 protruding a short distance through an opening 50 formed in the associated panel 18 (FIG. 4) of the fountain housing 20 or 20'. In this regard, in the preferred form, the outboard end of the valve body 28 is also externally threaded for thread-on reception of a lock nut 54 in addition to suitable fiber-based and elastomer-based washers 56 and 58. The valve body 28 is positioned with the elastomer washer 58 bearing against an inboard side of the panel 18, whereupon an outer ring nut 60 is threaded onto the valve body 28 for retaining said outboard end thereof in a position extending a short distance through the panel opening 50. In this position, the internally mounted valve cartridge 22 is externally exposed. The lock nut 54 includes external flats as shown to accommodate secure tightening against the inboard side of the panel 18, for securely retaining the valve body 28 mounted thereon.

The pushbutton 16 is provided as a portion of a pushbutton operator subassembly or unit 62 adapted for removable mounting onto the externally threaded outboard end of the valve body 28, thereby covering and concealing the internally mounted valve cartridge 22. More particularly, the pushbutton 16 comprises a generally a circular outboard face 64 joined at its periphery to a generally cylindrical outer skirt 66. The pushbutton 16 further includes a generally cylindrical inner flange 68 (FIG. 5) having a diametric size substantially less than the outer skirt 66, and including an external circumferential groove 70 formed therein. This pushbutton 16 has a size and shape for assembly with a mounting element such as a mounting ring or escutcheon ring 72 which is internally threaded for thread-on rotatable mounting onto the externally threaded outboard end of the valve body 28.

More specifically, the escutcheon ring 72 defines a central opening 74 sized for relatively close-fit but relatively free sliding reception of the inner flange 68 of the pushbutton 16, whereupon a C-shaped snap ring 76 or the like is seated within the flange groove 70. This snap ring 76 protrudes radially outwardly from the inner flange 68 a sufficient distance beyond the inner diameter defined by the central opening 74 of the escutcheon ring 72 to prevent axial separation of the pushbutton 16 from the escutcheon ring. However, the axial length of the pushbutton inner flange 68 and the location of the snap ring groove 70 therein are chosen so that the pushbutton 16 is axially movable through a short stroke between advanced and retracted positions relative to the escutcheon ring 72. In addition, this configuration permits relatively free and unrestricted rotation of the pushbutton 16 relative to the escutcheon ring 72, with respect to a common or coaxial axis of these assembled components. The outer skirt 66 of the pushbutton 16 overlies at least a portion of the perimeter of the escutcheon ring 72 to conceal the inner flange 68 and related snap ring connection from view.

Figure 4:
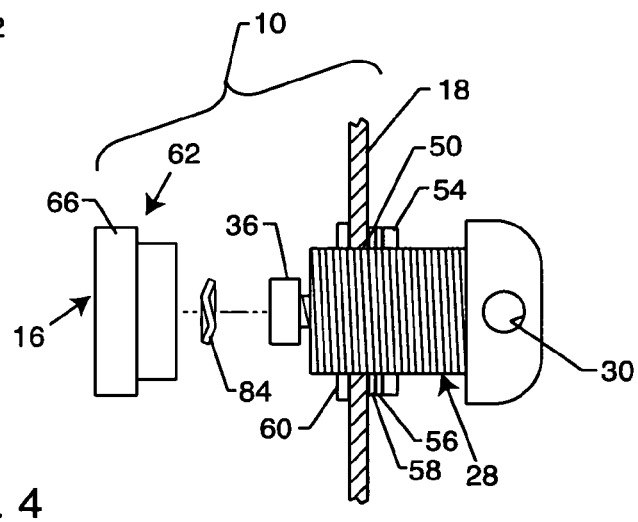
Figure 5:
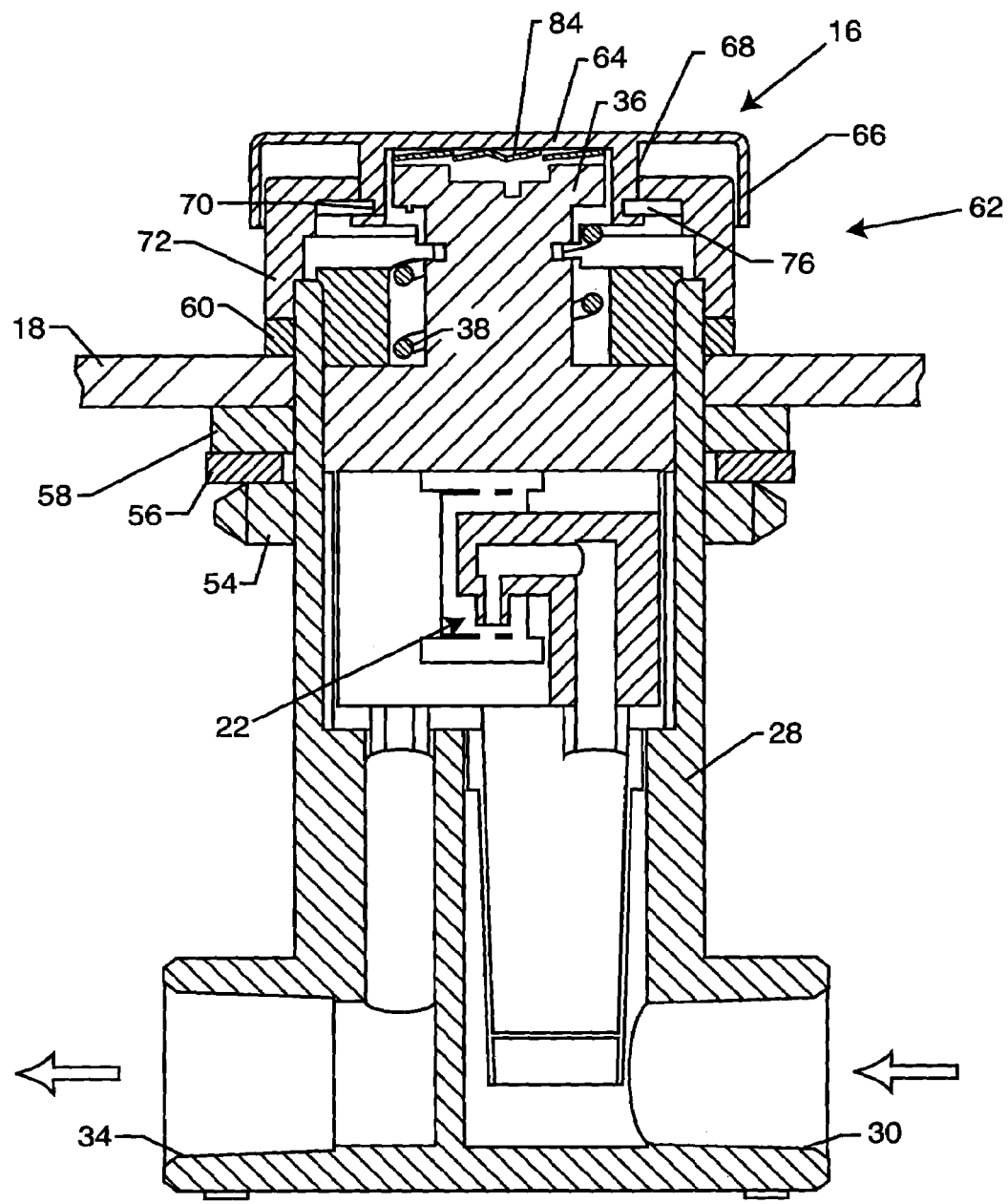

The thus-assembled pushbutton operator unit 62 is mounted onto the valve body 28 by rotatably installing the escutcheon ring 72 onto the externally threaded outboard end of the valve body, as viewed in FIG. 4. In this regard, suitable torque can be applied to the escutcheon ring 72 by means of the special tool 24 shown in the form of a spanner wrench (FIG. 2) having a pair of spaced-apart axially extending tool tips 78. These tool tips 78 can be fitted through a pair of diametrically opposed wrench ports 80 formed near the perimeter of the pushbutton outboard face 64, and seated within a corresponding pair of wrench ports 82 formed in the underlying escutcheon ring 72. Such engagement of the tool tips 78 with the escutcheon ring wrench ports 82 requires the pairs of wrench ports 80, 82 to be formed off-axis and at common radial positions relative to a centerline of the pushbutton operator unit 62 and/or a centerline of pushbutton rotation, and appropriate rotation of the pushbutton 16 for axially aligning the pushbutton wrench ports 80 with the underlying escutcheon ring wrench port 82. Prior to such mounting of the pushbutton operator unit 62 onto the valve body 28, a wave spring 84 or the like may be installed at the inboard side of the pushbutton 16 for engaging the outboard end of the valve stem 36 of the valve cartridge 22. This wave spring 84 beneficially eliminates any residual gap or lost motion between the valve cartridge stem 36 and an inboard face of the pushbutton 16 to provide a firm and responsive pushbutton actuation of the valve cartridge 22.

Following installation of the pushbutton operator unit 62 as described, the pushbutton 16 can be freely rotated to an orientation with its wrench ports 80 misaligned relative to the wrench ports 82 formed in the underlying escutcheon ring 72. In this configuration, a person using the fountain 14 can manually depress the externally exposed pushbutton 16 to correspondingly depress the valve stem 36 and thereby initiate water flow to the bubbler head 12. Upon release of the pushbutton 16, the spring 38 returns the valve stem 36 and the overlying pushbutton 16 to a non-depressed position with the water supply turned off.

In accordance with one primary aspect of the invention, the manner in which the pushbutton 16 is mounted onto the underlying valve assembly components is not readily or intuitively apparent to a person using the drinking fountain. The normal misalignment between the pushbutton wrench ports 80 relative to the underlying escutcheon ring wrench ports 82 disguises and conceals the manner in which the components are assembled, thereby deterring and discouraging attempts at tampering or vandalism. Even if the pushbutton 16 is inadvertently rotatably positioned for aligning the wrench ports 80 therein with the underlying wrench ports 82 formed in the escutcheon ring 72, the special tool 24 is still required in order to disassemble the components. As a result, the pushbutton valve assembly 10 of the present invention is highly resistant to unauthorized tampering or vandalism.

Figure 6:
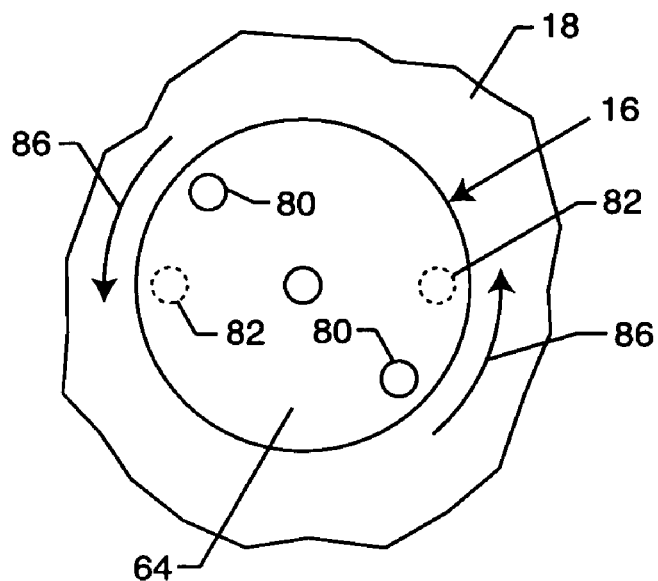
Figure 7:
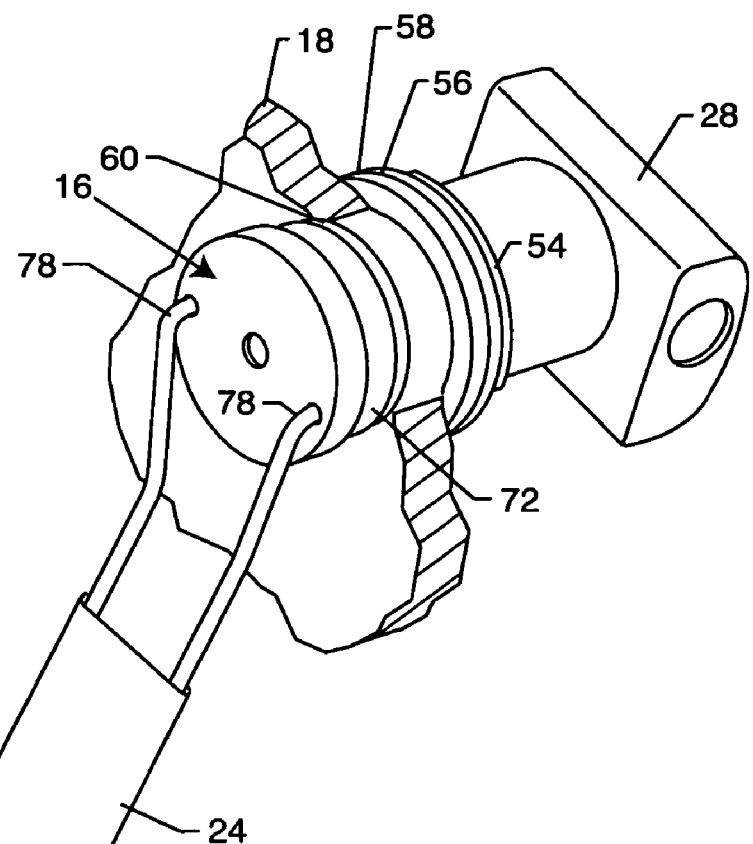
FIG. 7 is a perspective view similar to FIG. 2, but depicting the tool engaged with the pushbutton operator unit for removal thereof from the valve body.
Figure 8:
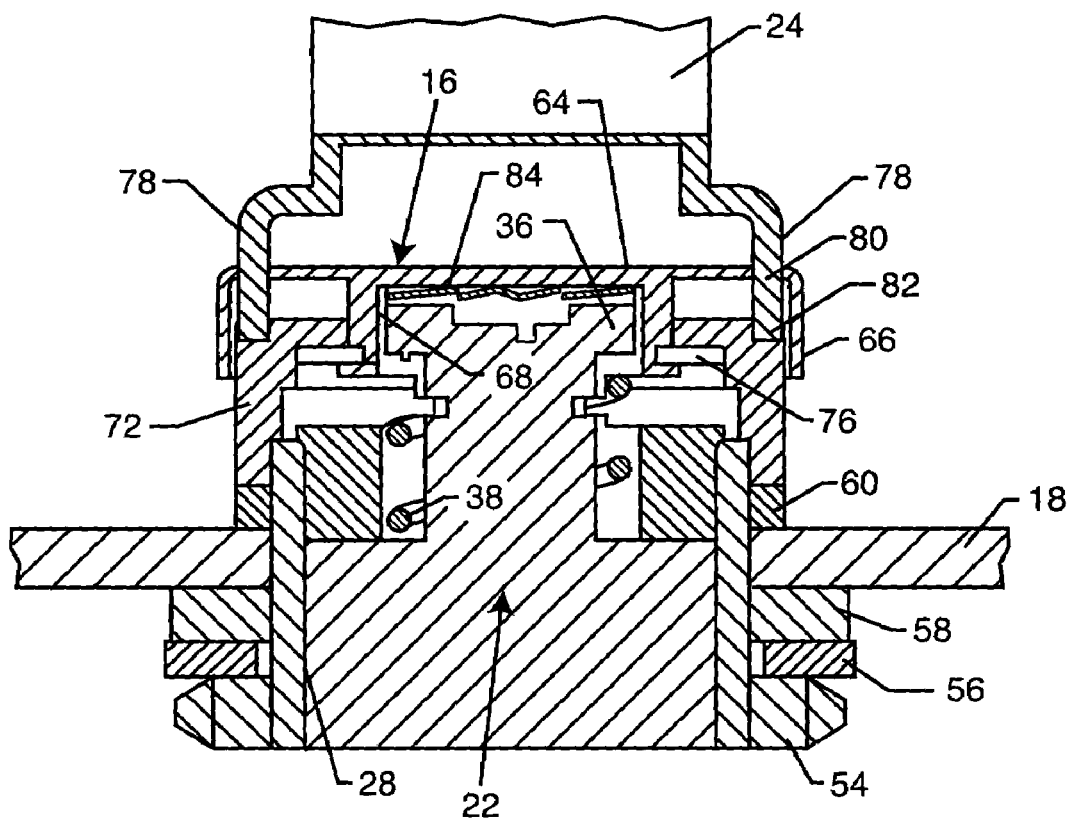
FIG. 8 is an enlarged and fragmented vertical sectional view similar to a portion of FIG. 5, and showing the tool engaged with the pushbutton operator unit.
Figure 9:
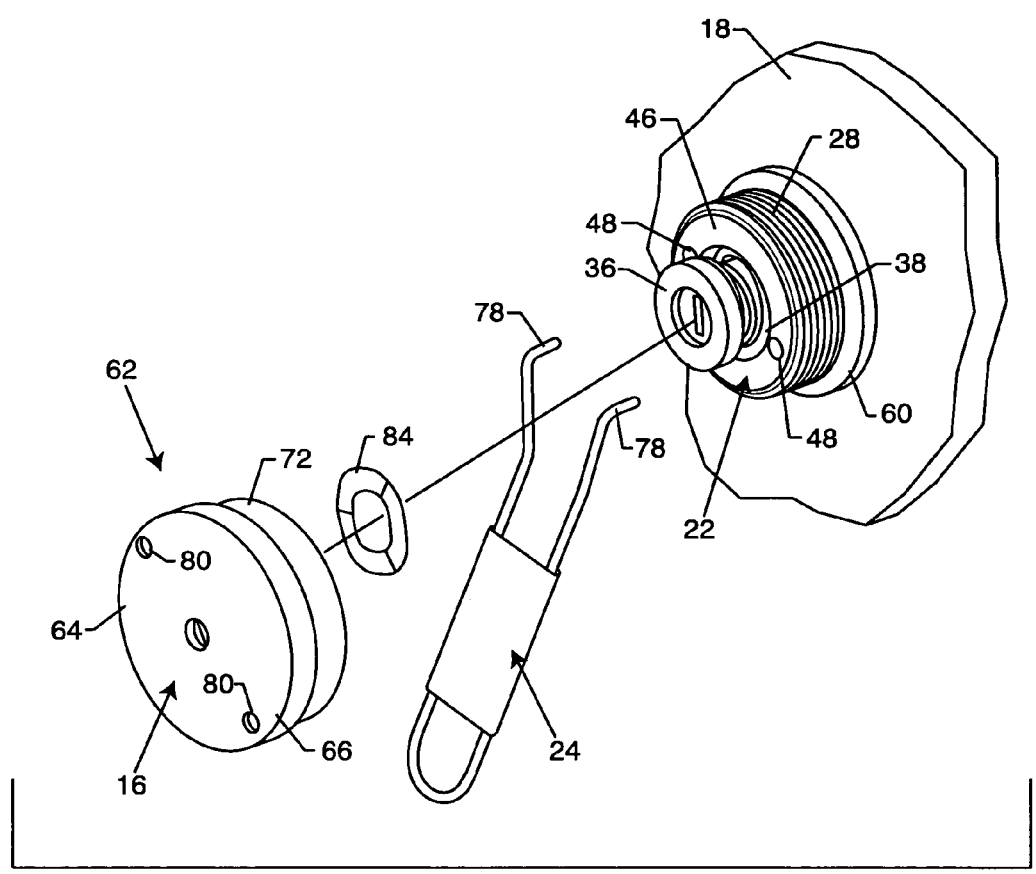
FIG. 9 is an exploded perspective view similar to FIGS. 2 and 7, but illustrating the pushbutton operator unit separated from the valve body, and further showing the tool for engaging and removing an internal retainer nut to expose and permit slide-out removal of the internally mounted valve cartridge.

However, the pushbutton operator unit 62 can be removed relatively quickly, easily and conveniently by maintenance personnel who understand the component construction and are equipped with the appropriate special tool 24, thereby facilitating periodic or as-needed service, cleaning, repair or replacement of the internal valve components. That is, the pushbutton operator unit 62 is removable by rotating the pushbutton 16 as indicated in FIG. 6 by arrows 86 for aligning the pushbutton wrench ports 80 with the escutcheon ring wrench ports 82, and then fitting the tool tips 78 of the special tool 24 into torque-drive engagement with the escutcheon ring (FIGS. 7–8). The escutcheon ring 72 can thus be rotatably disassembled quickly and easily from the valve body 28 to permit access to the internally mounted valve components from the exterior of the drinking fountain, as depicted in FIG. 9. The spacing of the tool tips 78 may be adjusted, or a second tool provided, for engaging the wrench ports 48 formed in the internal retainer nut 46 for rotatable removal thereof, in the event that removal of the valve cartridge 22 from the valve body 28 is desired or required.

Upon such valve cartridge removal, the filter element 40 may also be removed for appropriate cleaning or replacement. Following service, the valve components can be quickly and easily re-assembled for resumption of normal fountain operation. All of these component removal and reinstallation steps may be performed quickly and conveniently from the exterior of the fountain, by direct access through the open outboard end of the valve body 28.

A variety of modifications and improvements in and to the improved pushbutton valve assembly of the present invention will be apparent to those persons skilled in the art. By way of example, it will be appreciated that alternative rotatable component connections such as quarter-turn connections may be used in lieu of the threaded connections shown and described herein. In addition, it will be understood that the pushbutton valve assembly may be utilized for on-off control of water flow to a point of use other than a drinking fountain. Accordingly, no limitation on the invention is intended by way of the foregoing description and accompanying drawings.

What is claimed is:

1. A pushbutton valve assembly, comprising:
    a valve body including a water inlet port adapted for connection to a water supply and a water outlet port adapted for connection to a point of use;
    a valve unit mounted within said valve body and defining a water flow path between said water inlet and outlet ports, and further including a reciprocal valve member movable for respectively opening and closing said water flow path for on-off regulation of water flow from said water inlet port to said water outlet port; and
    a pushbutton operator unit including a mounting element rotatably mounted on said valve body, and a pushbutton carried by said mounting element for relatively free rotation and for reciprocal movement with respect thereto, said pushbutton being engageable with said reciprocal valve member for respectively opening and closing said water flow path, said pushbutton having an externally exposed outboard face;
    said pushbutton outboard face and said mounting element each including at least one wrench port formed therein at positions for substantial coaxial alignment with each other in a selected rotational position of said pushbutton relative to said mounting element to permit access to said at least one wrench port formed in said mounting element through said at least one wrench port formed in said pushbutton outboard face for rotatably installing and removing said mounting element with respect to said valve body.

2. The pushbutton valve assembly of claim 1 wherein said at least one wrench port formed in said pushbutton is axially misaligned with said at least one wrench port formed in said mounting element, when said pushbutton is in a rotational position other than said selected rotational position.

3. The pushbutton valve assembly of claim 1 wherein said reciprocal valve member comprises a reciprocal valve stem, said pushbutton being engageable with said valve stem.

4. The pushbutton valve assembly of claim 1 wherein said reciprocal valve member comprises a reciprocal valve stem movable between a nondepressed position for closing said water flow path and a depressed position for opening said water flow path, and spring means for normally retaining said valve stem in said nondepressed position.

5. The pushbutton valve assembly of claim 4 wherein said pushbutton is movable relative to said mounting element for displacing said valve stem between said depressed and nondepressed positions.

6. The pushbutton valve assembly of claim 4 further including an additional spring member interposed between said pushbutton and said valve stem for eliminating lost motion therebetween.

7. The pushbutton valve assembly of claim 1 further including a housing supporting a point of use, and means for mounting said valve body onto said housing.

8. The pushbutton valve assembly of claim 7 wherein said point of use comprises a drinking fountain bubbler head.

9. The pushbutton valve assembly of claim 1 wherein said mounting element comprises a mounting ring, said mounting ring and said valve body including cooperative mounting means for rotatably mounting said mounting ring on said valve body.

10. The pushbutton valve assembly of claim 9 wherein said cooperative mounting means comprises interengaging threads.

11. The pushbutton valve assembly of claim 9 wherein said mounting ring comprises an escutcheon ring.

12. The pushbutton valve assembly of claim 1 wherein said pushbutton includes an outer skirt having a size and shape for overlying and concealing at least a portion of the perimeter of said mounting element.

13. The pushbutton valve assembly of claim 1 wherein said mounting element comprises an annular mounting ring, said pushbutton including an inner skirt, said mounting ring defining an inner diameter sized for reception of said inner skirt therethrough, said inner skirt having an annular groove formed therein, and further including a snap ring seated within said groove and having diametric size greater than the inner diameter of said mounting ring, whereby said snap ring retains said pushbutton on said mounting ring for relatively free rotation and reciprocal movement with respect thereto.

14. The pushbutton valve assembly of claim 1 wherein said at least one wrench port formed in each of said pushbutton and said mounting element is formed off-axis and at common radial positions relative to a rotational centerline of said pushbutton.

15. The pushbutton valve assembly of claim 14 wherein said at least one wrench port formed in each of said pushbutton and said mounting element comprises a pair of wrench ports formed in each of said pushbutton and said mounting element at off-axis and at common radial positions relative to a rotational centerline of said pushbutton.

16. A pushbutton valve assembly for regulating on-off flow of water from a water source to a point of use, said pushbutton valve assembly comprising:
    a valve body including a water inlet port and a water outlet port;
    a valve cartridge mounted within said valve body and defining a water flow path between said water inlet and outlet ports, said valve cartridge further including a reciprocal valve member movable between open an closed positions for respectively opening and closing said water flow path;
    a pushbutton engageable with said reciprocal valve member for displacing said valve member between said open and closed positions, said pushbutton having an externally exposed outboard face; and
    a mounting element rotatably mounted on said valve body, said pushbutton being carried by said mounting element for relatively free rotation and for reciprocal movement with respect thereto;
    said pushbutton outboard face and said mounting element each including at least one wrench port formed therein at positions for substantial coaxial alignment with each other in a selected rotational position of said pushbutton relative to said mounting element to permit access to said at least one wrench port formed in said mounting element through said at least one wrench port formed in said pushbutton outboard face for rotatably installing and removing said mounting element with respect to said valve body.

17. The pushbutton valve assembly of claim 16 wherein said at least one wrench port formed in said pushbutton is axially misaligned with said at least one wrench port formed in said mounting element, when said pushbutton is in a rotational position other than said selected rotational position.

18. The pushbutton valve assembly of claim 16 wherein said reciprocal valve member comprises a reciprocal valve stem movable between a nondepressed closed position for closing said water flow path and a depressed open position for opening said water flow path, and spring means for normally retaining said valve stem in said nondepressed closed position.

19. The pushbutton valve assembly of claim 16 further including a drinking fountain housing, a bubbler head mounted on said housing, and means for mounting said valve body onto said housing.

20. The pushbutton valve assembly of claim 16 wherein said mounting element comprises a mounting ring, said mounting ring and said valve body including cooperative mounting means for rotatably mounting said mounting ring on said valve body.

21. The pushbutton valve assembly of claim 20 wherein said pushbutton includes an outer skirt having a size and shape for overlying and concealing the perimeter of said mounting ring.

22. The pushbutton valve assembly of claim 21 wherein said pushbutton further includes an inner skirt, said mounting ring defining an inner diameter sized for reception of said inner skirt therethrough and said inner skirt having an annular groove formed therein, and further including a snap ring seated within said groove and having diametric size greater than the inner diameter of said mounting ring, whereby said snap ring retains said pushbutton on said mounting ring for relatively free rotation and reciprocal movement with respect thereto.

23. The pushbutton valve assembly of claim 16 wherein said at least one wrench port formed in each of said pushbutton and said mounting element is formed off-axis and at common radial positions relative to a rotational centerline of said pushbutton.

24. The pushbutton valve assembly of claim 16 wherein said at least one wrench port formed in each of said pushbutton and said mounting element comprises a pair of wrench ports formed in each of said pushbutton and said mounting element at off-axis and at common radial positions relative to a rotational centerline of said pushbutton.

* * * * *